United States Patent
Kim et al.

(10) Patent No.: US 7,356,877 B2
(45) Date of Patent: Apr. 15, 2008

(54) CASTER

(75) Inventors: Byoung-taek Kim, Suwon-si (KR); Sang-hak Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/872,487

(22) Filed: Jun. 22, 2004

(65) Prior Publication Data

US 2005/0000056 A1    Jan. 6, 2005

(30) Foreign Application Priority Data

Jul. 2, 2003    (KR) .................... 10-2003-0044536

(51) Int. Cl.
*B60B 33/06* (2006.01)
(52) U.S. Cl. ................. 16/32; 16/44; 16/105
(58) Field of Classification Search ............. 16/19, 16/32–34, 44, 99, 105, 20
See application file for complete search history.

(56) References Cited

U.S. PATENT DOCUMENTS

| | | | | |
|---|---|---|---|---|
| 72,956 A | * | 12/1867 | Youngs et al. ............. | 16/44 |
| 1,019,302 A | * | 3/1912 | Butcher ..................... | 16/32 |
| 1,022,646 A | * | 4/1912 | Toll .......................... | 16/32 |
| 1,050,352 A | * | 1/1913 | Deutschman ............. | 16/32 |
| 2,461,778 A | * | 2/1949 | Schacht .................... | 16/20 |
| 2,795,892 A | * | 6/1957 | Lautenbacher et al. .. | 248/183.3 |
| 2,852,883 A | * | 9/1958 | Walsh ....................... | 248/188.9 |
| 4,103,391 A | * | 8/1978 | Thomsen .................. | 16/33 |
| 5,375,294 A | * | 12/1994 | Garrett ..................... | 16/34 |
| 5,956,805 A | * | 9/1999 | Huang ...................... | 16/33 |
| 6,473,935 B1 | * | 11/2002 | Cherukuri ................ | 16/33 |
| 6,871,379 B2 | * | 3/2005 | Ebeling et al. ........... | 16/19 |

FOREIGN PATENT DOCUMENTS

| | | |
|---|---|---|
| JP | HEI 7-27354 | 5/1995 |
| JP | 07-298939 | 11/1995 |
| JP | 2000-016003 | 1/2000 |

OTHER PUBLICATIONS

Korean Official Action issued on Jun. 30, 2005, for Korean Patent Application No. 10-2003-0044536.
Chinese Office Action dated Sep. 21, 2007 issued in CN 200410062527.3.

* cited by examiner

*Primary Examiner*—Robert J. Sandy
(74) *Attorney, Agent, or Firm*—Stanzione & Kim, LLP (57) ABSTRACT

A caster includes a fixing portion installed on a bottom surface of an object, a wheel portion which is installed to be elevated into a flange portion and has a moving wheel provided on a bottom surface of the wheel portion, and an elevating portion to control the wheel portion to elevate into the flange portion. The wheel portion descends from the fixing portion to move the object and elevates into the fixing portion to fixedly dispose the object in a position. Therefore, a height of the caster is controlled to be high when the heavy object is being moved, and controlled to be low when fixing the object in a position, thus improving the appearance of the object.

22 Claims, 6 Drawing Sheets

CASTER

CROSS-REFERENCE TO RELATED APPLICATIONS

This application claims the priority of Korean Patent Application No. 2003-44536, filed on Jul. 2, 2003, in the Korean Intellectual Property Office, the disclosure of which is incorporated herein in its entirety by reference.

BACKGROUND OF THE INVENTION

1. Field of the Invention

The present general inventive concept relates to a caster, which is installed on a bottom surface of an object, such as a projection television, to easily move the object, and particularly, to a caster used with an object and having an adjustable height with respect to the object.

2. Description of the Related Art

Recently, electric devices have been becoming larger and larger, since desires of consumers are changing and technology is developing. A television, in particular, is an effective medium for satisfying consumers' desire for information and directly relates to daily lives of the consumers.

Therefore, televisions of larger sizes are continually being put on the market to respond to the desires of consumers. Since a large television, especially, a projection television, has large dimensions and is heavy, it is difficult to move the television.

Therefore, in order to move the heavy projection television having large dimensions, a caster is installed on a lower portion of the projection television.

Figure 1:
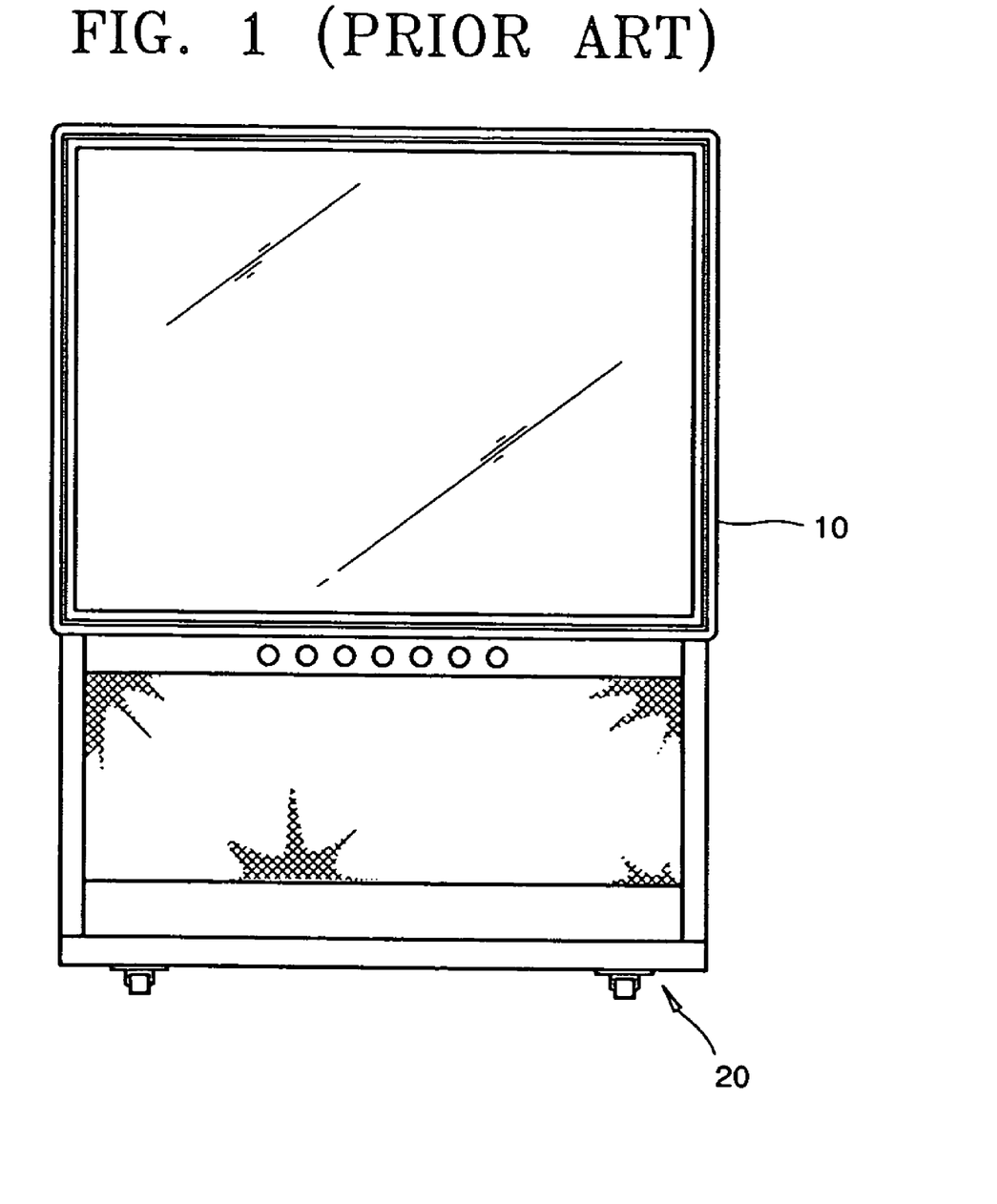
FIG. 1 is a front view of a projection television including a conventional caster.
Figure 2:
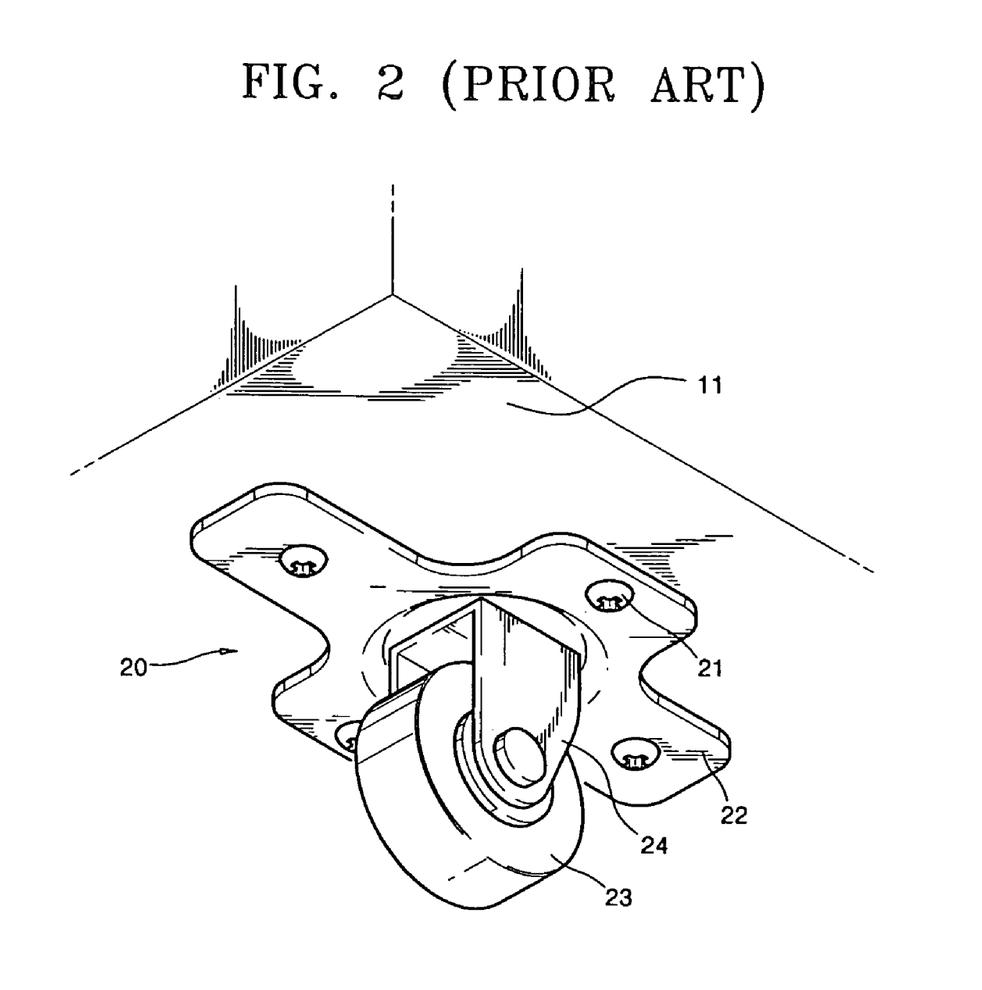
FIG. 2 is a partial perspective view of the caster shown in FIG. 1.

FIG. 1 is a front view of a projection television 10, to which a conventional caster 20 is applied, and FIG. 2 is a partial perspective view of the caster in FIG. 1.

Referring to FIGS. 1 and 2, the conventional caster 20 includes a flange portion 22 installed to be coupled to a bottom surface 11 of the projection television 10 using a plurality of screws 21, and a wheel portion 24 rotatably installed on the flange portion 22 to support a moving wheel 23, which is installed on a lower portion of the flange portion 22.

Therefore, when a user pushes the projection television 10 in a desired direction, the wheel portion 24 rotates with respect to the flange portion 22 installed on the bottom surface 11 of the projection television 10 so as to face the pushing direction, and the moving wheel 23 rolls while rotating. Therefore, the projection television 10 can be moved easily in the desired direction with a small amount of force.

However, since a height of the conventional caster 20 cannot be controlled, the projection television 10 is apart from the ground by a height of the flange portion 22 even when the projection television 10 is stopped on a position or moved to another position. Therefore, the conventional caster defiles the appearance of the projection television 10.

SUMMARY OF THE INVENTION

In order to solve the above and/or other problems, it is an aspect of the present general inventive concept to provide a caster having a height, which can be controlled differently in a moving state and in a stopped state.

Additional aspects and advantages of the present general inventive concept will be set forth in part in the description which follows and, in part, will be obvious from the description, or may be learned by practice of the general inventive concept.

The above and/or other aspects of the present general inventive concept may be achieved by providing a caster including a fixing portion installed on a bottom surface of a heavy object, a wheel portion installed to be elevated into a flange portion and having a moving wheel, and an elevating portion to elevate the wheel portion into the flange portion, wherein the wheel portion descends from the fixing portion when the heavy object is moved, and the wheel portion elevates into the fixing portion when the heavy object is fixed on a position.

The above and/or other aspects of the present general inventive concept may also be achieved by providing a caster used with an object, the caster including a fixing portion having a flange and a cylindrical portion protruding from the flange in a first direction, a wheel potion having a supporting portion movably inserted into an inside of the cylindrical portion and a rotating portion disposed to protrude from the supporting portion in a second direction opposite to the first direction, and an elevating portion to control the supporting portion so that a height of the wheel portion with respect to the flange in the second direction varies.

The above and/or other aspects of the present general inventive concept may also be achieved by providing a caster used with an object having a main body and a bottom surface, the caster including a fixing portion having a flange attached to the bottom surface of the object and a cylindrical portion extended from the flange toward an inside of the main body, a wheel portion having a supporting portion movably inserted into an inside of the cylindrical portion a rotating portion extended from the supporting portion toward an outside of the main body, and a moving wheel rotatably attached to the rotating portion, and an elevating portion disposed in the cylindrical portion and having a guide plate formed on the inside of the cylindrical portion, a rotating member rotatably installed on the supporting portion to communicate with the guide plate to control the supporting portion to move with respect to the fixing portion so that a distance between the moving wheel and the bottom surface of the object varies, and an elastic member to bias the rotating member toward the wheel portion.

BRIEF DESCRIPTION OF THE DRAWINGS

The above and/or other features and advantages of the present general inventive concept will become more apparent by describing in detail exemplary embodiments thereof with reference to the attached drawings in which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 3:
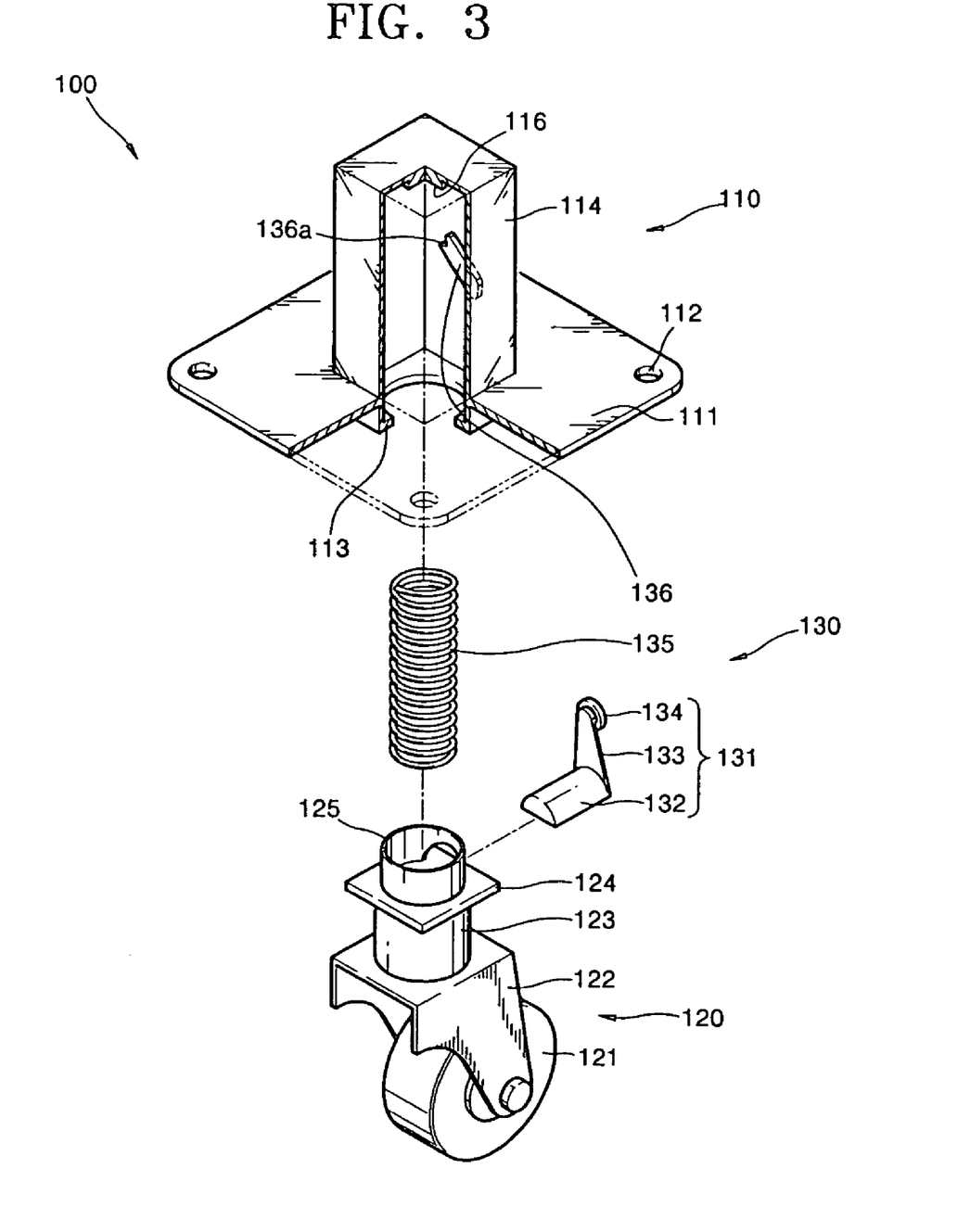
FIG. 3 is an exploded perspective view of a caster according to an embodiment of the present general inventive concept.

Referring to FIG. 3, a caster 100 according to an embodiment of the present general inventive concept can be a device installed on a bottom surface of an object, to easily move the object and can include a fixing portion 110, a wheel portion 120, and an elevating portion 130. The object may be a heavy object, for example, a projection television.

The fixing portion 110 can include a flange 111 on which a plurality of penetrating holes 112 are formed, so that the fixing portion 110 can be fixed onto the bottom surface of the object using a coupling unit (not shown), and a cylindrical portion 114 which extends from the flange 111 by a predetermined distance in an elevating direction of the wheel portion 120 to guide the wheel portion 120 to be elevated in an empty space formed inside the cylindrical portion 114. Therefore, the wheel portion 120 can be guided by the cylindrical portion 114 and elevated with respect to the cylindrical portion 114.

A fixing unit 113 can be disposed on a lower side of the cylindrical portion 114 to prevent the wheel portion 120 from escaping from the cylindrical portion 114 when a portion of the wheel portion 120 is inserted and elevated into the cylindrical portion 114. Therefore, when the portion of the wheel portion 120 is inserted into the cylindrical portion 114, a movement of the wheel portion 120 can be limited by the fixing unit 113, and the wheel portion 120 can be prevented from escaping the cylindrical portion 114.

The portion of the wheel portion 120 can be inserted into the cylindrical portion 114, and the wheel portion 120 can be elevated with respect to the fixing portion 110 and may include a supporting portion 123 having a suspending step 124 which is suspended by the fixing unit 113 on the lower portion of the cylindrical portion 114, and a rotating portion 122 freely rotatably installed on the supporting portion 123 with respect to the supporting portion 123 and having a moving wheel 121 on a lower portion thereof.

The elevating portion 130 can control the wheel portion 120 to be elevated within the fixing portion 110 and can include a rotating member 131, a spring 135, and a guiding plate 136.

The rotating member 131 can be mounted on an upper surface of the supporting portion 123 to be rotatable in left and right directions with respect to the cylindrical portion 114 and can include a body 132 formed as a semicylinder, a guide portion 133 to protrude from one side of the body 132 toward the elevating direction of the wheel portion 120, and a rolling portion 134 rotatably supported by an end of the guide portion 133.

The rotating member 131 can be inserted into a controlling portion 125 disposed on the upper surface of the supporting portion 123 to control a rotating operation in the left and right directions of the rotating member 131 when the wheel portion 120 is elevated into the fixing portion 110. Since the rotating member 131 is mounted on the upper surface of the supporting portion 123 to be elastically biased toward an original position as shown in FIG. 4, by the spring 135 and not to be supported by any other unit, the rotating member 131 can be inserted into the controlling unit 125 so that operations of the rotating member 131 are controlled.

Figure 4:
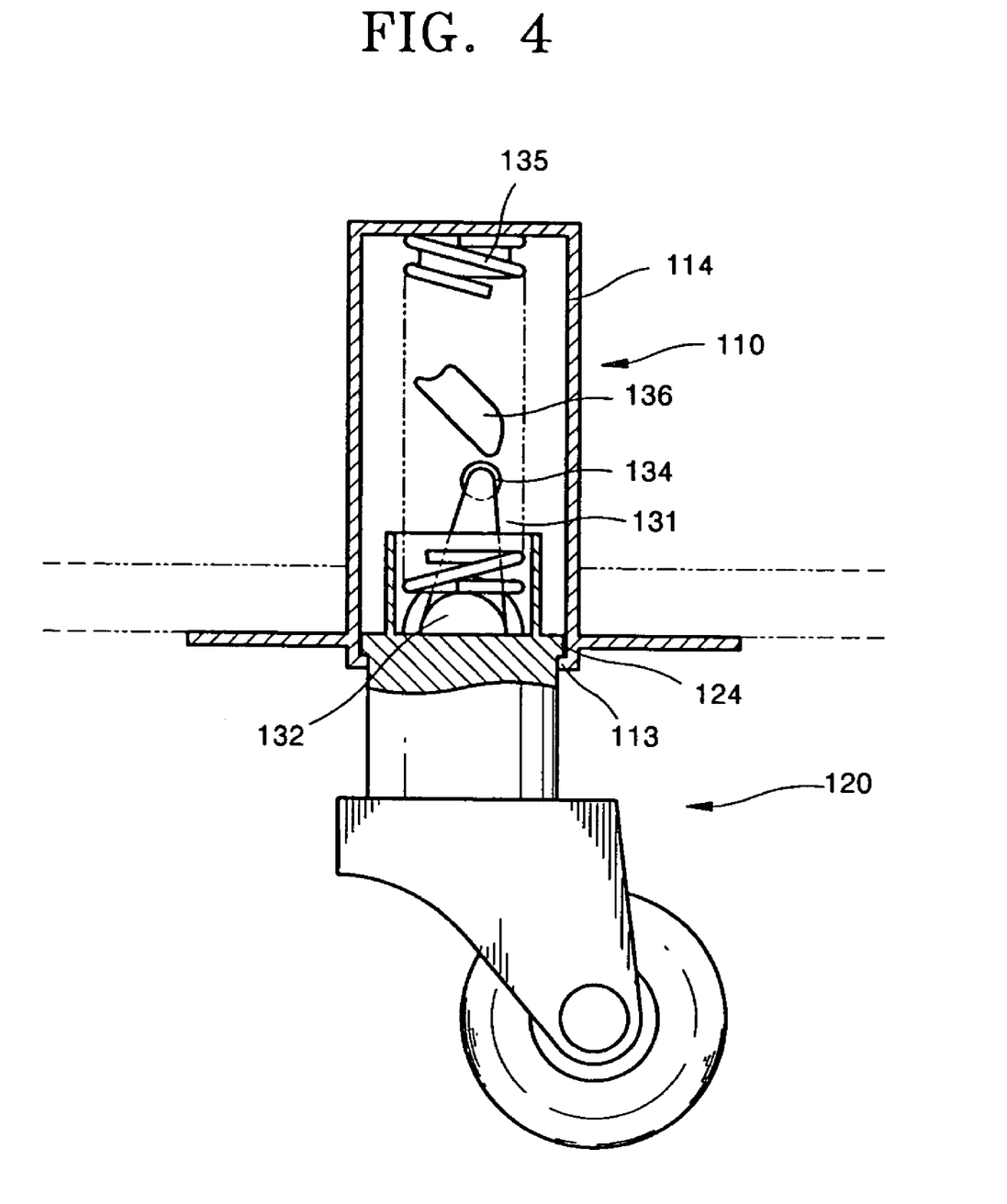
FIG. 4 through FIG. 6 are cross-sectional views describing operations of the caster according to another embodiment of the present general inventive concept.
Figure 5:
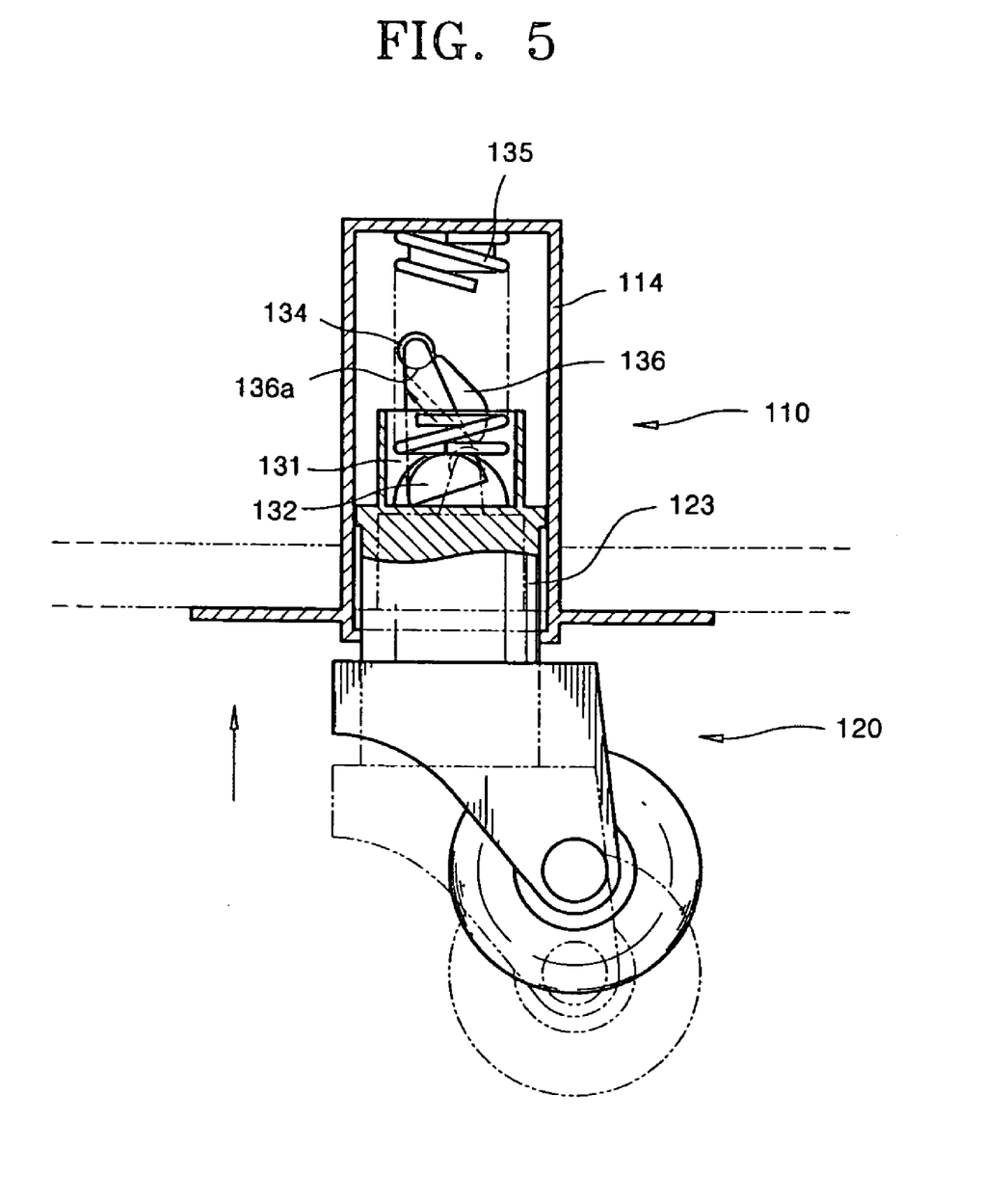
Figure 6:
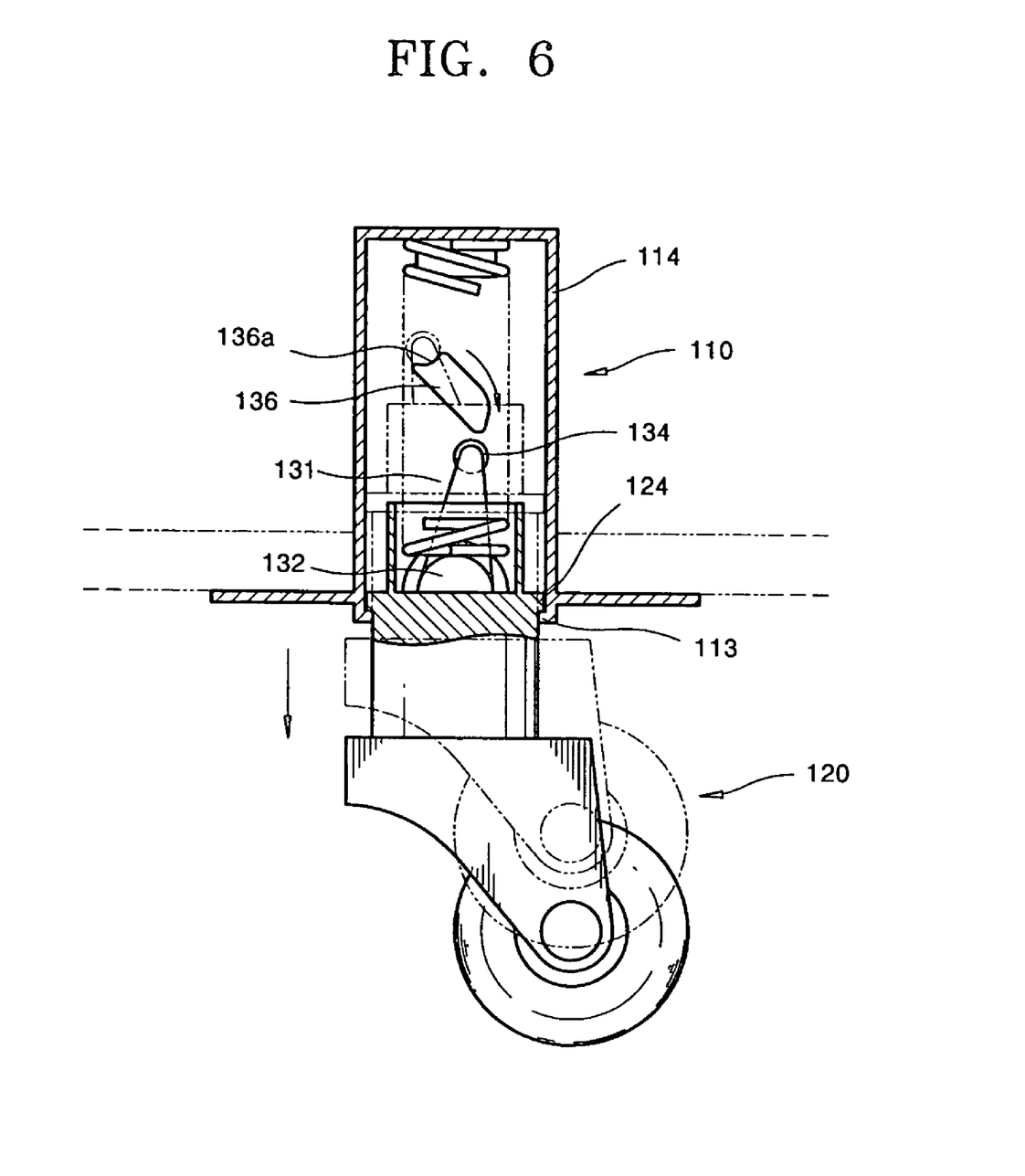

The guide portion 133 can be formed on the body 132 eccentrically with respect to a center axis of the body 132 on the guide plate 136, so that the wheel portion 120 is fixedly disposed on a fixed position of the fixing portion 110 as elevated within the fixing portion 110 as shown in FIG. 5, or return to an original position after descending from the fixed position of the fixing portion 110 as shown in FIGS. 4 and 6. Also, the guide portion 133 may be disposed eccentrically with respect to the body 132.

One side of the spring 135 can be supported by a protrusion unit 116 which is formed on an inner upper surface of the cylindrical portion 114, and the other side of the spring 135 is installed to compress the upper portion of the body 132. Therefore, the wheel portion 120 can be elastically biased from the fixing portion 110 by the spring 135 toward the descending direction thereof.

The guide plate 136 protrudes from an inner surface of the cylindrical portion 114. Since the rolling portion 134 rotates while contacting an outer circumferential surface of the guide plate 136 when the wheel portion 120 is elevated within the fixing portion 110, the rotating member 131 can be operated by the guide plate 136.

A concave recess 136a, on which the rolling portion 134 can be fixedly disposed, can be formed on the outer circumferential surface of the guide plate 136 by elevating the wheel portion 120 the fixed position of into the fixing portion 110.

Therefore, when the rolling portion 134 returns to its original position by rotating along a profile of the outer surface of the guiding plate 136, the wheel portion 120 also returns to its original position after being elevated and descending with respect to the fixing portion 110. The above processes form an operational cycle.

Operations of the caster 100 according to another embodiment of the present general inventive concept will be described with reference to FIGS. 3 through 6.

FIG. 4 shows a status when the object is being moved. The wheel portion 120 can be inserted into the cylindrical portion 114 of the fixing portion 110 so that the suspending step 124 fixedly suspended by the fixing unit 113, and elastically biased in a downward direction by the spring 135.

Since the spring 135 presses the upper surface of the body 132 of the rotating member 131 downward, the wheel portion 120 protrudes as far as possible from the fixing portion 110. In addition, the rolling portion 134 can be separated from the guiding plate 136.

FIG. 5 shows a state in which the object is fixedly disposed in a certain position. In FIG. 5, an arrow represents a moving direction of the wheel portion 120 with respect to the fixing portion 110. However, the fixing portion 110 can move downward when the object is pushed down toward the moving wheel 121.

When the object is pushed downward, the wheel portion 120 can elevate along an inner circumferential surface of the cylindrical portion 114. Here, the rolling portion 134 can move along the profile of the outer circumferential surface of the guiding plate 136.

When the rolling portion 134 is mounted on the concave recess 136a after moving along the profile of the guiding plate 136, the wheel portion 120 can be fully inserted into the fixing portion 110.

Here, the rolling portion 134 can move along the profile of the outer circumferential surface of the guiding plate 136 in a manner that the rotating member 131 is elastically biased by the spring 135, thus the rotating member 131 slants leftward in FIG. 5 and a right side of the body 132 is separated from the supporting portion 123.

The spring 135 can be elastically transformed when the wheel portion 120 moves toward an upper side of the fixing portion 110.

Referring to FIG. 6, when the object is pushed downwardly, the rolling portion 134 escapes from the concave recess 136a. Here, the rotating member 131 returns to the original position by an elastic force of the spring 135, and the rolling portion 134 can move downward along the profile of the outer circumferential surface of the guiding plate 136.

The wheel portion 120 can move in a downward direction along the inner surface of the cylindrical portion 114. When the wheel portion 120 descends along the inner surface of the cylindrical portion 114 and the suspending step 124 is suspended by the fixing unit 113, the rolling portion 134 can be separated from the guiding plate 136 and the rotating member 131 returns to its original position. Therefore, the caster can return to the status shown in FIG. 4.

As describe above, a height of the caster with respect to the object can be controlled. Therefore, the height of the caster is controlled to be high when the object is being moved, and controlled to be low when the weighed object is fixed in a position, thus improving the appearance of the object. That is the caster is controlled to protrude from a bottom of the object and to be inserted into the object so that a height of the bottom of the object with respect to a base (ground) level on which the moving whales disposed, is controlled.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A caster used with an object comprising:
a fixing portion installed on a bottom surface of an object;
a wheel portion which is installed to be elevated into the fixing portion and has a moving wheel provided on a bottom surface of the wheel portion; an elevating portion having a rotating member disposed on a portion of the elevating portion to be rotatable with respect to the elevating portion and a guide plate contacting a rolling member of the elevating portion to control the wheel portion to be elevated into the fixing portion between a first fixed position and a second fixed position such that the wheel does not enter the fixing portion and the guide plate guides the rotating member when a force is applied to the elevating portion to push the object and the wheel portion together with respect to a reference position; and,
an elastic member installed on an upper surface of a body of therotating member to elastically bias the rotating member in a downward direction of the fixing portion,
wherein the wheel portion descends from the fixing portion into the first fixed position to move the object and elevates with respect to the fixing portion into the second fixed position to fixedly dispose the object in a position.

2. The caster of claim 1, wherein the fixing portion comprises:
a flange having a plurality of penetrating holes so that the flange can be fixed on the bottom surface of the object using a coupling unit; and
a cylinder protruding from the flange and having a hollow inner space so that the wheel portion is inserted and elevated within the hollow inner space of the cylinder.

3. The caster of claim 2, wherein the fixing portion comprises a fixing unit disposed on a lower side of the cylinder to prevent the wheel portion from escaping from the cylinder.

4. The caster of claim 3, wherein the wheel portion includes a suspending step disposed within the cylinder to control the fixing unit to be suspended within the cylinder.

5. The caster of claim 1, wherein:
the rotating member includes a semicylindrical body mounted on an upper side of the wheel portion to be rotatable in left and right directions with respect to the fixing portion, and a guide portion that protrudes from one end of the body and includes the rolling portion on the other end of the guide portion; and
the guide plate protrudes from an inner wall of the fixing portion to contact the rolling portion to guide an operation of the rotating member when the wheel portion is elevated within the fixing portion.

6. The caster of claim 5, wherein the fixing portion comprises a protrusion unit formed on an inner upper surface thereof to support one side of the spring.

7. The caster of claim 5, wherein the guide portion is disposed eccentrically with respect to the body.

8. The caster of claim 5, wherein the guide plate comprises a concave recess, on which the rolling portion is disposed, to control the wheel portion to be elevated with respect to the fixing portion.

9. The caster of claim 5, wherein the wheel portion comprises a controlling unit into which the rotating member is inserted to control a rotation of the rotating member.

10. The caster of claim 1, wherein the rotating member is rotated around a perimeter of the guide plate when switching between the first and second fixed positions.

11. The caster of claim 1, wherein the rotating member and the guide plate are enclosed within the fixing portion by inner sidewalls of the fixing portion.

12. A caster used with an object, comprising:
a fixing portion including a cylindrical portion being insertable into the object in a first direction with respect to a bottom surface of the object and a flange projecting outward from side surfaces of the cylindrical portion in a second direction that is perpendicular to the first direction and having at least one fastener hole to attach to the bottom surface of the object when the cylindrical portion is inserted into the object;
a wheel portion having a supporting portion movably inserted into an inside of the cylindrical portion, a rotating portion disposed to protrude from the supporting portion in a third direction opposite to the first direction, and a moving wheel rotatably installed on the rotating portion wherein the wheel does not enter the fixing portion;
an elevating portion to control the supporting portion to change a height of the wheel portion with respect to the flange in the third direction; and
an elastic member to bias the wheel portion in the third direction.

13. The caster of claim 12, wherein the elevating portion comprises:
a guide plate formed on an inside surface of the cylindrical portion; and
a rotating member formed on the supporting portion to communicate with the guide plate to change the height of the wheel portion.

14. The caster of claim 13, wherein the guide plate is inclined with respect to the first and third directions.

15. The caster of claim 13, wherein the guide plate comprises two sides, a recess formed between first ends of the two sides, and the rotating member comprises a rolling portion to rotatably travel along the two side, the recess, and the round portion of the guide plate to change the height of the wheel portion.

16. The caster of claim 15, wherein the height comprises a first height when the rolling portion is disposed on the recess of the guide plate, and a second height greater than the first height when the rolling portion is disposed around the round portion of the guide plate.

17. The caster of claim 15, wherein the two sides of the guide plate have an angle with respect to the first or third direction.

18. The caster of claim 12, wherein the elevating portion is disposed the inside of the cylindrical portion of the fixing portion.

19. The caster of claim 12, wherein the fixing portion and the wheel portion comprise a fixing unit and a supporting step, respectively, to limit the height of the wheel portion with respect to the flange in the third direction.

20. A caster used with an object having a main body and a bottom surface, comprising:
- a fixing portion having a flange attached to the bottom surface of the object, and having a cylindrical portion extended from the flange toward an inside of the main body;
- a wheel portion having a supporting portion movably inserted into an inside of the cylindrical portion, having a rotating portion extended from the supporting portion toward an outside of the main body, and having a moving wheel rotatably attached to the rotating portion; and
- an elevating portion disposed in the cylindrical portion, and having a guide plate formed on the inside of the cylindrical portion, a rotating member rotatably installed on the supporting portion to communicate with the guide plate to control the supporting portion to move with respect to the fixing portion so that a distance between the moving wheel and the bottom surface of the object varies, and an elastic member to bias the rotation member toward the wheel portion.

21. A caster usable with an object, comprising:
- a hollow fixing part that is insertable in a bottom surface of the object;
- an elevating part coupled to the hollow fixing part to support a wheel between an elevated position and a descended position with respect to the hollow fixing part, the elevating part including:
  - a spring disposed in the hollow fixing part to bias the wheel in a direction along a central axis of the hollow fixing part,
  - a guiding plate disposed adjacent to inner walls of the hollow fixing part, and
  - a moving member enclosed within the hollow fixing part by the inner walls of the hollow fixing part and coupled to the spring to lock the wheel in one of the elevated and the descended positions by engaging the guiding plate of the hollow fixing part.

22. The caster of claim 21, wherein a first vertical push of the wheel causes the moving member to position the wheel in the elevated position with respect to the hollow fixing part, and a second vertical push of the wheel causes the moving member to position the wheel in the descended position with respect to the hollow fixing part.

* * * * *